UNITED STATES PATENT OFFICE

OLOF GUSTAV BOHLIN, OF HELSINGBORG, SWEDEN, ASSIGNOR TO HELSINGBORGS GUMMIFABRIKS AKTIEBOLAG, OF HELSINGBORG, SWEDEN

RUBBER ARTICLES OF EVERY KIND

No Drawing. Application filed January 21, 1930, Serial No. 422,496, and in Germany December 20, 1929.

It is known to provide articles of felt, e. g. hair hats of poor quality, with a superficial nap consisting of finer woolly hairs fixed to the underlying felt by gluing, also to cover the surface of linen or the like with a nap of woolly hairs fixed to the textile by being partly imbedded in an adhesive applied to the linen surface. My invention relates to an improvement in rubber articles of every kind, e. g. sheets of rubber in combination with other substances and with or without inlays of textile material or the like, rubber footwear or other articles made from such sheets or by pressing, and the invention is characterized in that the surface of the rubber article, or part thereof, has a nap which gives the article an appearance corresponding e. g. to suede and makes it feel like skin. Besides aiming to the product the invention relates also to the process by which rubber articles of every kind are provided with the said nap. The nap thus applied to rubber articles consists of shorter or longer, especially relatively short fibres or the like, which are according to the invention partly embedded in and held by the surface of the rubber article, so that parts of the said fibres or the like project from the rubber surface and give it a nap-like surface layer. Normally the fibres or other fibre-like materials serving to produce the nap are dyed with a colour corresponding to the rubber articles on which the nap has to be placed, and this dyeing is most easily carried out before the fibres are attached to the rubber surface. A material well adapted for the production of nap on rubber articles is cellulose fibre, consisting of wood-pulp which has been dried and finely divided so that the individual fibres may easily be separated and spread in an air current or air layer. Cellulose fibres are much better than e. g. woolly hairs or the like fibres adapted for imitation of a leather-like surface or a leather nap. Leather imitations have, therefore, hitherto normally been made from cellulose materials, e. g. leather paper or imitation leather. When used for nap on rubber articles cellulose fibres have the special advantage over other fibres that they are able to survive the vulcanization of the rubber article without damage. The imitation nap may be applied to the rubber article, e. g. the outside or inside of a galosh or the surface of a rubber sheet, in the following manner as an example: The surface to be provided with a nap is subjected to a preparation either by heat or by suitable solvent, as e. g. benzine, so as to bring the outer layer of the surface into a more or less soft or plastic state. This may also be obtained by applying to the surface of the rubber sheet or article a liquid rubber solution, or other suitable adhesive adapted to join the rubber and the fibrous material in question. When the rubber surface has been made sticky, the desired nap of fibres or the like is spread thereon, e. g. by blowing air or gases containing the fibres which are to form the nap on to the sticky surface. Instead of blowing the fibres on to the rubber surface I may bring the rubber article into a chamber or the like filled with air saturated with fibres. Such a fibre saturated air space can be obtained e. g. under a wire-gauze sieve, on the surface of which the fibre material is shaken about. When the rubber has been covered with a sufficiently thick fibre layer, the supply of the fibres ceases, and the next step of the process consists of causing all the fibres or parts thereof to adhere, in any suitable way, to the underlying prepared rubber surface. This fixing of the fibres to the surface of the rubber article or sheet is normally performed by an outer pressure, e. g. a rolling, by which the fibrous layer is pressed down upon the rubber surface, with the result that the adhesive surface is totally covered by the fibres wholly or partly embedded in the outmost surface layer of the rubber article. The superfluous fibres not fixed to the rubber may easily be brushed off or removed in other ways, and the rubber article appears thereafter with a fibrous nap looking and feeling quite like the nap of e. g. suede. In many cases the preparation, whereby the surface of the rubber article is rendered adhesive, may be dispensed with. The nap may be applied equally well to the rubber article, while the surface of the latter is still sticky by a rolling or pressing or other treatment during manufacture. The fibres to form the nap may be applied in other ways than by blowing or the like; e. g. the fibre layer may be applied to the rubber surface by similar processes to those employed in the transfer of pictures to e. g. glass panes. The rubber product provided with the above specified nap is normally made in the form of sheets inter-layered with linen or the like, and the material is, therefore, particularly adapted for use for the manufacture of rubber footwear to which it is desired to give the appearance of leather footwear. The material is also well suited for use as a substitute for leather in general, e. g. articles of dress quite corresponding to those now made from leather, particularly suede, may be made from the present material. The invention is not limited to the above examples of the employment of the material or the performance of the process, the principle of the invention being solely that a desired imitation of a nap is applied to rubber articles.

I claim:

1. An article of manufacture comprising a foundation layer of rubber and a nap upon said layer of fibers of prepared wood pulp cellulose.

2. An article of manufacture comprising a foundation layer of rubber and a nap upon said layer of finely divided dried fibers of wood pulp cellulose.

3. An article of manufacture comprising a foundation layer of rubber, a nap upon a surface of said foundation layer of prepared wood pulp cellulose and said foundation layer and said nap being dyed identical colors.

4. A method of making an article manufacture comprising rendering the surface of a foundation layer of rubber soft and plastic and then applying thereto a nap of dried wood pulp cellulose fibers.

5. A method of manufacturing an article of manufacture comprising rendering the foundation layer of rubber adhesive upon a surface thereof, then applying to said sticky surface a nap of dried wood pulp cellulose fibers, said fibers being dyed the same color as said rubber foundation.

In testimony whereof I affix my signature.

OLOF GUSTAV BOHLIN.